July 10, 1962 O. I. THOMPSON 3,043,021

ELECTRONIC INSTRUCTING DEVICE

Filed Nov. 19, 1958 4 Sheets-Sheet 1

Inventor:
Orville I. Thompson
By: Graf, Nierman & Burmeister
Attorneys

July 10, 1962 O. I. THOMPSON 3,043,021

ELECTRONIC INSTRUCTING DEVICE

Filed Nov. 19, 1958 4 Sheets-Sheet 2

Inventor:
Orville I. Thompson
By: Graf, Nierman & Burmeister
Attorneys

ELECTRONIC INSTRUCTING DEVICE

Filed Nov. 19, 1958 4 Sheets-Sheet 3

Inventor:
Orville I. Thompson
By: Graf, Niermann & Burmeister
Attorneys

Inventor:
Orville I. Thompson
By: Graf, Nierman & Burmeister
Attorneys 3,043,021
ELECTRONIC INSTRUCTING DEVICE Orville I. Thompson, Deerfield, Ill., assignor to De Vry Technical Institute, Inc., Chicago, Ill., a corporation of Illinois Filed Nov. 19, 1958, Ser. No. 775,035
16 Claims. (Cl. 35—19)

The present invention relates generally to devices for facilitating construction of temporary or experimental electronic devices, and particularly to devices to aid the instruction of students of electronics.

Even the most complicated electronic device may be diagrammed with a symbol used for each component and a line interconnecting the symbols to indicate electrical connections. There are accepted schematic symbols for each electrical component, or in the alternative, symbols representing the physical appearance of each component may be employed in such a schematic circuit diagram. The education of students of electronics requires instruction in the use of schematic circuit diagrams including construction of electronic equipment from such diagrams.

Originally, students merely referred to such a diagram when constructing electronic apparatus, but this procedure was found to be time consuming and often resulted in a piece of apparatus which was of little value beyond the benefit to the student in making it. Boards were then provided with clips for receiving the terminal wires of electronic components and other wires so that electronic apparatus could be assembled on the board with reference to a schematic circuit diagram. This equipment facilitated tearing down the equipment and re-using the electronic components. In order to increase the accuracy and speed with which an inexperienced student could assemble a unit of electronic equipment, an overlay sheet with the schematic diagram of the equipment to be constructed was provided for such clip boards, the overlay sheet having an opening for each of the clips, so that the electronic components could be assembled directly over the schematic diagram on the clips of the clip board. Generally, the overlays of such equipment show the exact placement and connections for each component, rather than merely a diagram of interconnected symbols, so that errors are greatly reduced and the work of the student speeded up. A further advance in equipment suitable for this method of instruction is disclosed in the copending patent application of the present inventor entitled "Educational Device for Training Electronic Technicians," filed May 9, 1955, Serial No. 506,748, now Patent No. 2,882,618, which discloses a transparent board with premounted tube sockets and underlay instruction charts provided with openings for the protruding tubes and other protruding components. With this device, the wiring is entirely accomplished on the side of the transparent board opposite the underlay instruction chart, the chart being visible through the board and having the schematic circuit diagram thereon. As a result, the instruction chart may be removed after a portion of the equipment is completed and replaced with a second chart which shows the schematic diagram for a portion of the equipment to be constructed next.

It is one of the objects of the present invention to provide a device for instructing students with a novel means for securing wires and components to a board which is both less costly and facilitates assembly and disassembly of the equipment.

It is a further object of the present invention to provide an instructional device for students with a transparent board and an underlay chart for schematic diagrams which requires no components to be assembled to the board.

These and further objects of the present invention will be more readily apparent from a further reading of this disclosure, particularly when viewed in the light of the drawings, in which.

Figure 1:
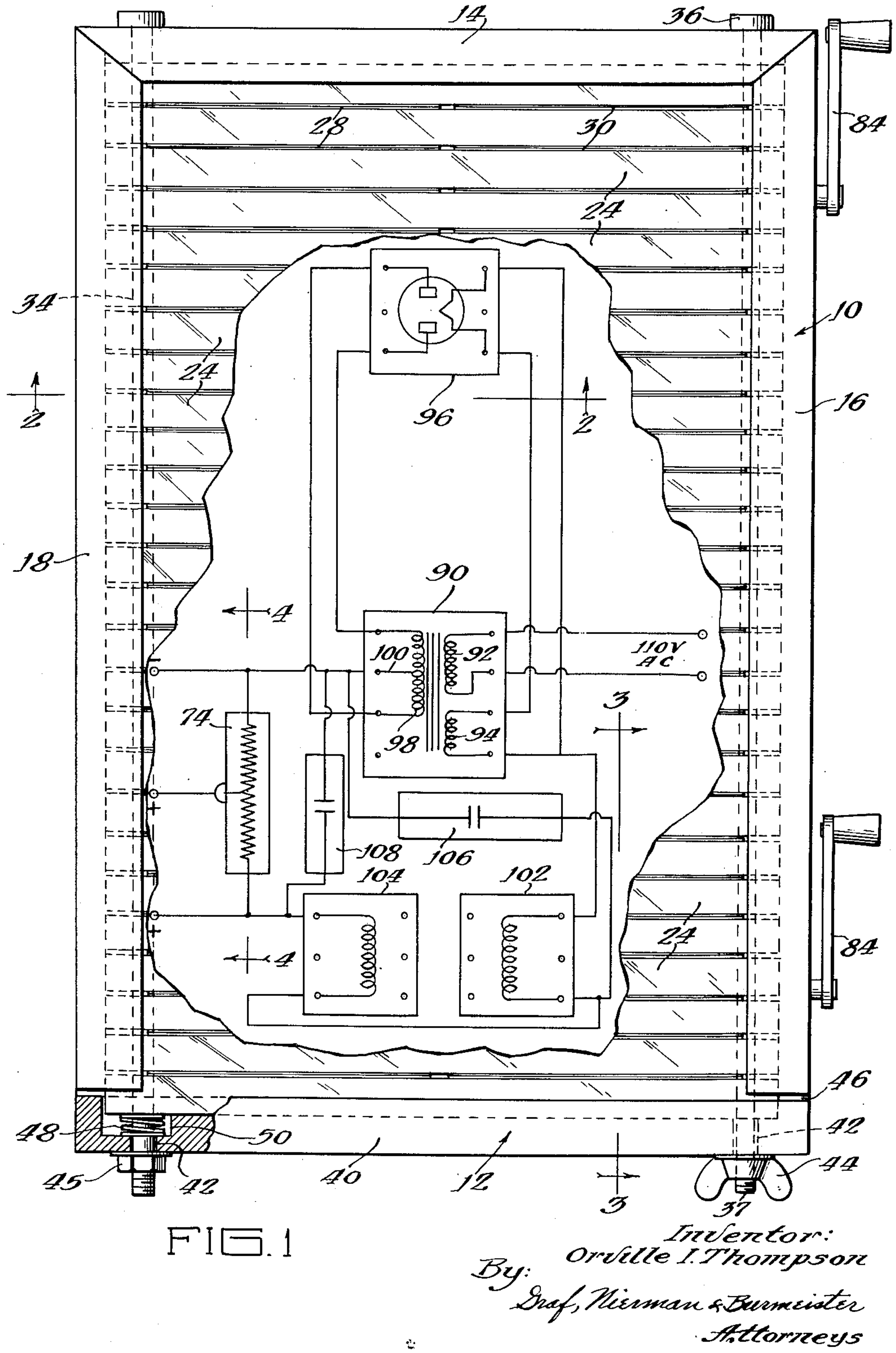
FIGURE 1 is a plan view of an instructional device (without components) constructed according to the teachings of the present invention and partially broken away for clarity to illustrate an underlay circuit diagram in position for instruction.

The instructional device illustrated in FIGURES 1 through 5 has a frame 10 with end pieces 12 and 14 and sides 16 and 18. The sides 16 and 18 are each provided with a slot 20 adjacent to one edge, and the slots in the two sides 16 and 18 confront each other. The ends 12 and 14 of the frame 10 are also provided with slots 22 which confront each other and are in a common plane with the slots 20.

A plurality of bars 24 of the same length are mounted with their ends slidably disposed within the slots 20 in the sides 16 and 18 of the frame 10. The bars 24 have parallel surfaces 26 which confront the surfaces of adjacent bars, and as illustrated, the bars have rectangular cross-sections. The bars 24 are constructed of transparent electrically insulating material, such as Lucite or other transparent plastic or glass. The ends of the bars 24 are of slightly smaller dimensions than the slots 20 and 22, so that the bars are readily translatable in the slots 20.

Each of the surfaces 26 is provided with two electrically conducting layers or coatings 28 and 30 of equal length. The coating 28 extends along the surfaces 26 of the bars 24 from a plane spaced from the side 18 of the frame 10 to a plane slightly spaced from the centers of the bars 24, and the coating 30 extends from a plane near the opposite side of the center of the bars 24 to a plane spaced from the side 16 of the frame 10. As a result, there is an uncoated region 32 on the surface 26 of each bar 24 between the coatings 28 and 30 which forms an electrically insulating gap. The coatings 28 of one bar 24 abut the coatings 28 of the adjacent bars, and the coatings 30 of one bar abut the coatings 30 of the two adjacent bars, thereby avoiding electrical connection between the coatings 28 and 30. The coatings may be of any electrically conducting material which adheres to the surface of the bars, such as copper, silver or gold. It is to be understood that not only coatings can be used, but electrically conducting layers formed by physically securing plates or strips of electrically conducting materials to the surfaces 26 of the bars 24 can also be employed.

It is to be noted that the coatings 28 and 30 do not extend to the sides 18 and 16, respectively. Each of the bars 24 is provided with a bore 33 in this region adjacent to the sides 16 and 18, and the bores 33 accommodate a rod 34 which extends from the ends 12 and 14 along the inner edge of the sides 16 and 18. The bars 24 are slidably guided by the rods 34, and since the coatings 28 and 30 have no contact with the rods 34, the rods 34 may be constructed of metal even though electrically conducting.

The sum of the widths of the bars 24 is less than the length of the slots 20 so that the bars may be translated in the slots 20. As a result, the end of a wire or the wire terminal of a component of the device being constructed may be inserted between the coatings 28 or 30 of two adjacent bars 24 to form electrical contact with the coating. Also, a plurality of wires may be inserted between a single pair of confronting coatings, thus interconnecting the wires, and in this manner virtually any electrical circuit may be built up.

Figures 2, 3, 5:
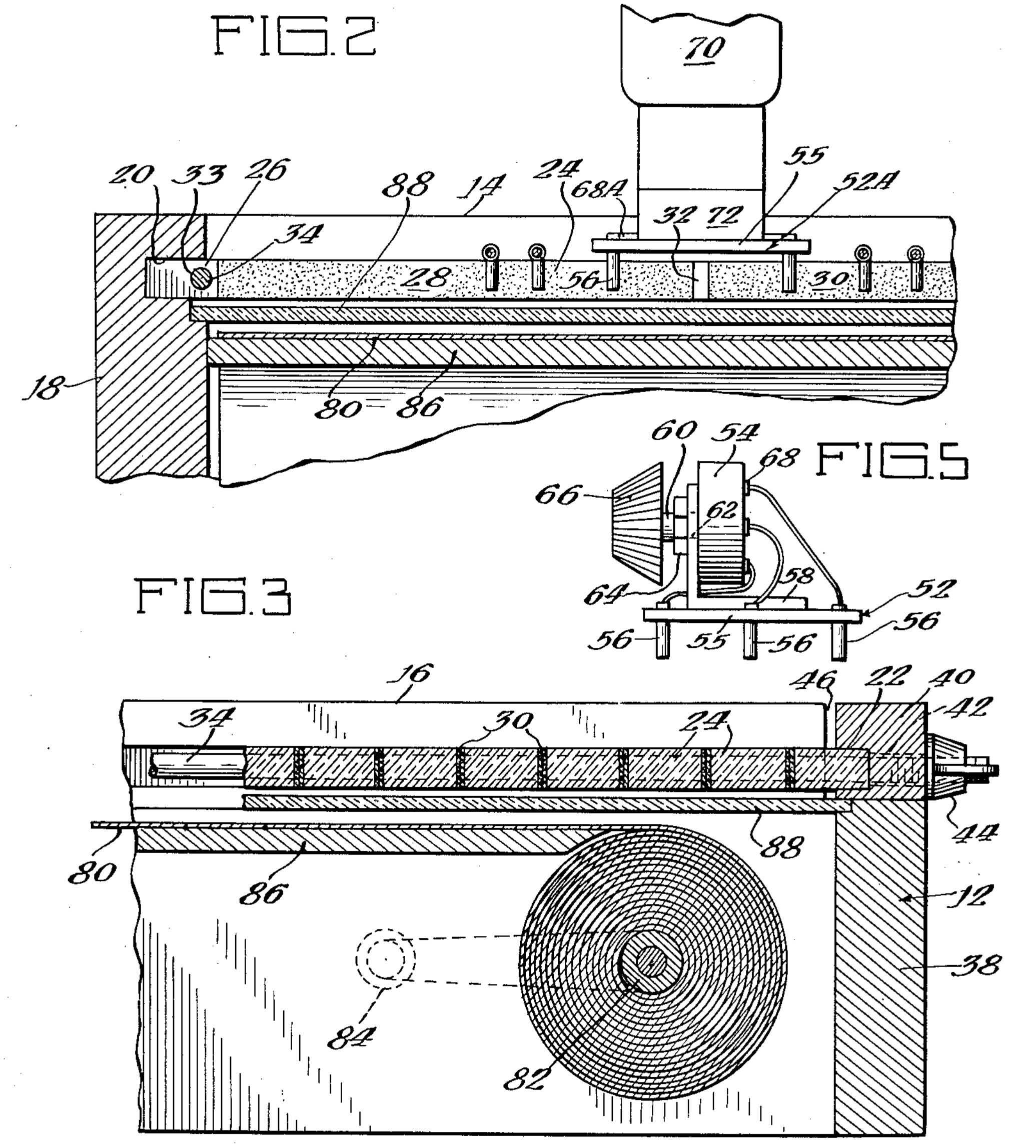
FIGURE 2 is a sectional view taken along the line 2—2 of FIGURE 1 with the components indicated in the circuit diagram illustrated in FIGURE 1 mounted in position.
FIGURE 3 is a sectional view taken along the line 3—3 of FIGURE 1.
FIGURE 5 is an elevational view of a shaft controlled electronic component and mounting means therefor which is suitable for use in the device of FIGURES 1 through 4.

Each of the rods 34 has a protruding flange 36 abutting the end 14 and a threaded portion 37 protruding from the end confronting the end 12 of the frame 10. The end 14 of the frame 10 is a single piece, however, the end 12 has a lower portion 38 which is integral with the frame 10 and a slot forming strip 40, as indicated in FIGURE 3. The strip 40 has two apertures 42 which receive the rods 34, and lock nuts 44 and 45 are threaded onto the ends of the rods 34. A gap 46 is disposed between the strip 40 and the confronting ends of the sides 16 and 18 to permit the strip 40 to be drawn up tight against the bars 24 by the rods 34 and lock nuts 44 and 45. In this manner, the wires which are disposed between confronting coatings of the bars 24 are locked or clamped in place.

As illustrated in FIGURE 1, one of the lock nuts 44 is a wing nut, and may thus directly be used to tighten the bars 24 in place. The other lock nut 45, however, is illustrated as a hexagonal nut, and a helical spring 48 is disposed in a recess 50 in the strip 40 and about the rod 34. With this construction, the spring maintains a relatively constant pressure between bars 24 regardless of the number of wires disposed between the bars, and it is not necessary to loosen the nut 45 to insert wires or to hold them in position. The nut 45 is merely used to provide an adjustment of the pressure between bars.

Not all electronic components are available with wire terminals, commonly referred to as "pig tails," and it is necessary to provide an adaptor for these components. Further, some components are provided with rigid pins which are not spaced by the proper distances to be directly accommodated by the device, and these components also require adaptors. FIGURE 5 illustrates an adaptor designated 52 for mounting an electronic component which is provided with a shaft for adjustment. In FIGURE 5, a variable resistor 54 is illustrated as the component, although it is to be understood that variable capacitors and inductors may be mounted to similar adaptors. The adaptor 52 has a rectangular board 55 of electrically insulating material, such as fiberboard, and at least two pins 56 are mounted to the board 55 in parallel spaced relation, the distance between the pins being a multiple of the distance between the coatings 28 or 30 of the bars 24. Where more than two pins 56 are required, the pins may be mounted in parallel rows spaced as indicated above, or on planes spaced by multiples of the distance between the coatings 28 or 30 of the bars 24. As illustrated in FIGURE 5, the pins 56 are mounted in a single row with proper spacing.

An angle bracket 58 is mounted to the board 55, and the shaft 60 of the component 54 extends through an aperture 62 in the angle bracket. A lock nut 64 secures the component 54 to the angle bracket 58, and a knob 66 is mounted to the end of the shaft 60 to facilitate adjustment of the component 54. The component 54 has terminal lugs 68 which are electrically connected to the pins 56.

FIGURE 2 illustrates a similar adaptor designated 52A for mounting a vacuum tube 70 to the instruction device, identical elements of the adaptor 52A being designated by the same reference numerals as employed for the adaptor 52. Since vacuum tubes are provided with pins which are not properly spaced for insertion between the bars 24, except perhaps those vacuum tubes having only four terminals, a socket 72 for the tube 70 is mounted to the board 55, and the lugs 68A of the tube socket 72 are electrically connected to the pins 56 of the adaptor 52A.

Figure 4:
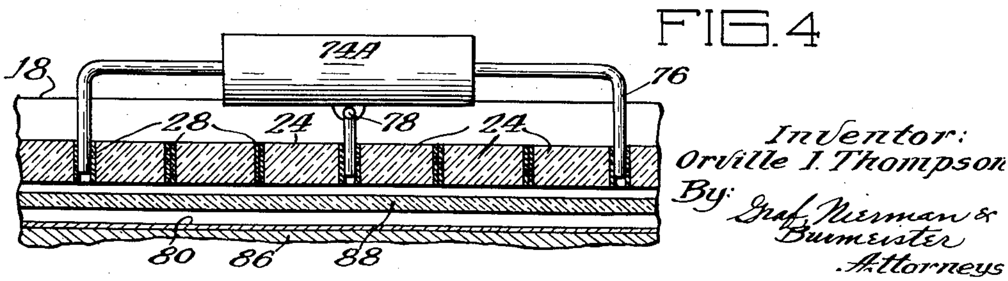
FIGURE 4 is a sectional view taken along the line 4—4 of FIGURE 1 with the component illustrated in the circuit diagram of FIGURE 1 mounted in position.

FIGURE 4 illustrates the manner in which components with pig tails or wire leads are directly mounted to the instructional device and directly mounted over the symbol for the same component as it appears on the chart or diagram. In FIGURE 1, the electrical circuit diagram for a power supply is illustrated, and one of the components schematically illustrated in FIGURE 1 is a center tapped resistor 74. FIGURE 4 illustrates the physical embodiment of this resistor, designated 74A, with its terminal wires 76 mounted between the electrically conducting coatings 28 of the bars 24. Also, the center tap 78 of the resistor 74 has a terminal wire positioned between a third pair of electrically conducting coatings 28. It is to be understood that other components provided with terminal wires, such as capacitors and chokes, and the like may be mounted in like manner.

It is desirable to provide a large number of schematic diagrams for use in the instructional device here disclosed, and for this reason, an elongated strip 80 upon which a plurality of diagrams are disposed is translatably mounted on the underside of the transparent bars 24. The strip 80 has its ends secured to spools 82 which are rotatable by means of handles 84. The spools 82 are mounted adjacent to the ends 12 and 14 of the frame 10, and the strip 80 is translatably supported on a plate 86 mounted between the sides 16 and 18 of the frame 10. As illustrated in FIGURE 3, the plate 86 terminates at a distance from the ends 12 and 14 to permit the strip 80 access to the rolls 82. A transparent plate 88 is also mounted between the sides 16 and 18 between the plate 86 and the bars 24 forming a channel for the strip 80. The purposes of the transparent plate 88, which may be of glass or transparent plastic, is to prevent the wires or pins which are inserted between the electrically conducting coatings of the bars from piercing the strip 80, and also to prevent dirt from filtering through to the strip 80.

The electrical circuit diagram illustrated in FIGURE 1 is the diagram of a power supply for converting alternating current to direct current. It is to be understood that this diagram is of a conventional device, and that other types of electronic devices may be similarly diagrammed, and it is contemplated that the strip 80 will display schematic diagrams for many different types of electronic devices. The schematic diagram of FIGURE 1 illustrates a power transformer 90 with a primary winding 92 connected to a source of 110 volt alternating current. The transformer 90 has a filament winding 94 connected to the filament terminals of a vacuum tube 96, and a secondary winding 98 connected to the plates of the vacuum tube 96. The secondary winding 98 has a center tap 100 which is connected to the negative terminal of the power supply. The power supply has an input choke 102 and an output choke 104 connected in series and to one of the filaments of the vacuum tube 96. A capacitor 106 is connected between the center tap 100 of the transformer 90 and the junction between the chokes 102 and 104, and a second capacitor 108 is connected between the center tap 100 of the transformer 90 and the end of the choke 104 opposite the choke 102. This end of the choke 104 is also connected to an output terminal, and the center tapped resistor 74 is connected between this terminal of the choke 104 and the center tap 100 of the transformer 90.

Figures 6, 7:
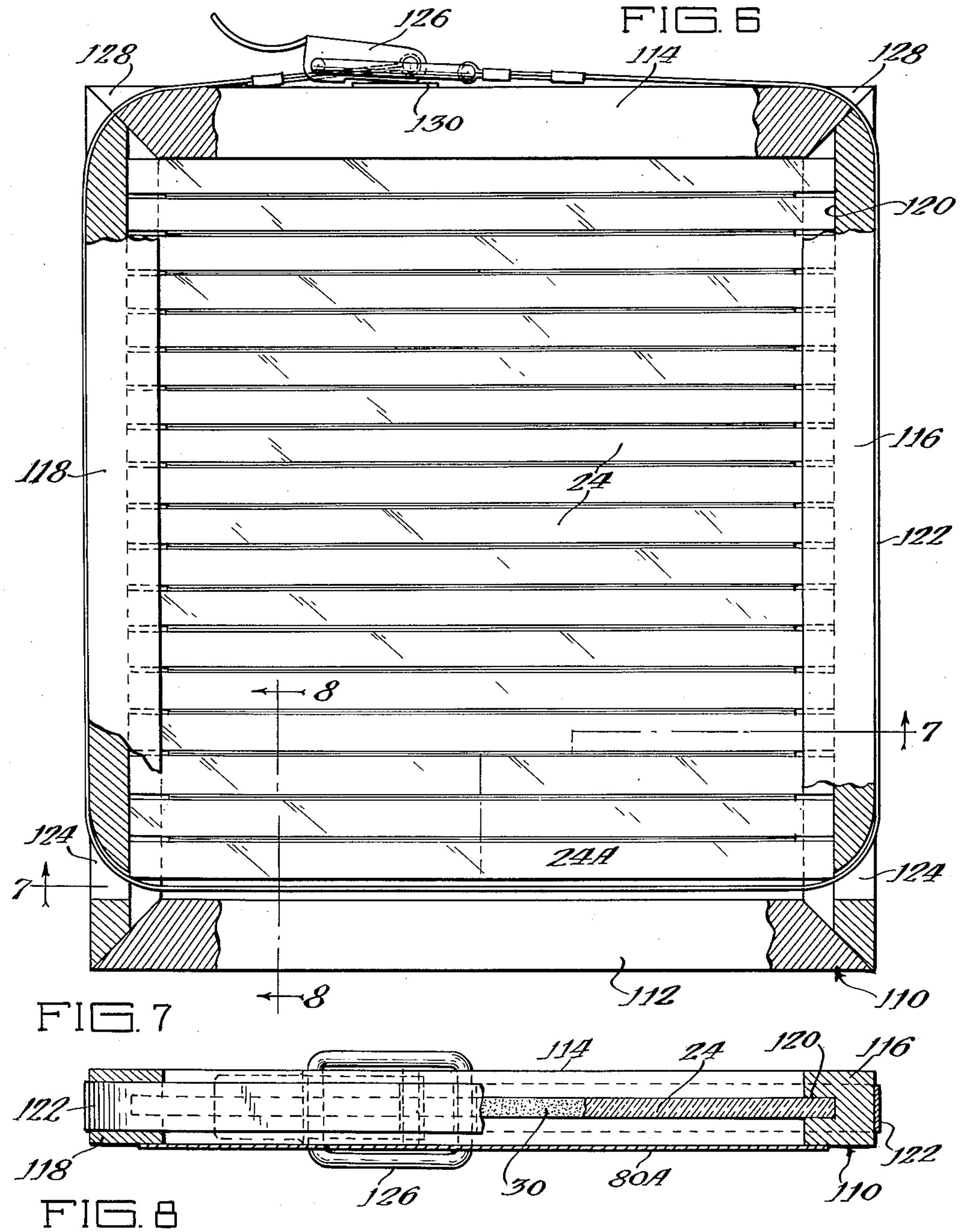
FIGURE 6 is a plan view partly cut away and in section, of a device which constitutes another embodiment of the present invention.
FIGURE 7 is a sectional view taken along the line 7—7 of FIGURE 6.
Figure 8:
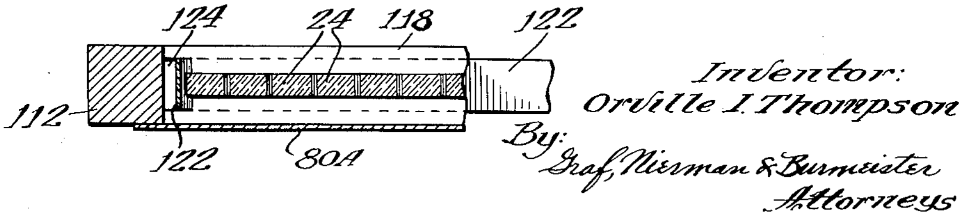
FIGURE 8 is a sectional view taken along the line 8—8 of FIGURE 6.

FIGURES 6, 7, and 8 illustrate another embodiment of an instructional device which constitutes the present invention, and identical elements of this device bear the same reference numerals as in the device of FIGURES 1 through 5. The instructional device of FIGURES 6 through 8 has a frame 110 with ends 112 and 114 and sides 116 and 118. The ends 112 and 114 and sides 116 and 118 are secured together to form the rigid rectangular frame 110. The sides 116 and 118 are provided with slots 120 for translatably receiving the ends of a plurality of rectangular elongated bars 24 which are provided with electrically conducting coatings, as indicated in the embodiment of FIGURES 1 through 5. Further, the ends 112 and 114 of the frame 110 are rectangular in cross-section and need not be provided with slots corresponding to the slots 120.

A flexible strap 122 extends about the periphery of the sides 116 and 118 and the end 114, and the strap 122 extends through openings 124 in the sides 116 and 118 adjacent to the end 112. In this manner, the strap 122 extends between the end 112 and the confronting bar 24A. The ends of the strap 122 terminate confronting the end 114, and the ends are attached to a hinge type buckle 126. The buckle 126 in its closed position, as illustrated in FIGURE 6, tightens the strap 122 to force the bars 24 together and against the end 114, thereby clamping the wires and pins which are disposed between the electrically conducting coatings of the bars in position. When the hinge type clamp 124 is in the open position, the flexible strap 122 permits translation of the bars 24 toward the end 112 to provide adequate space for inserting pins and wires between the bars 24. The corners formed between the end 114 and the sides 116 are provided with curved slots 128 for the purpose of retaining the flexible strap 122 in position about the frame 110 when the hinge type clamp 126 is in the open position and to facilitate tightening the flexible strap about the frame. Also, a plate 130 is disposed between the hinge type clamp 126 and the end 114 to permit the clamp to abut the frame 110 and ride thereagainst while the clamp is being closed. A chart 80A for instructional diagrams is secured to one side of the frame and serves the same function as the chart 80.

Figure 9:
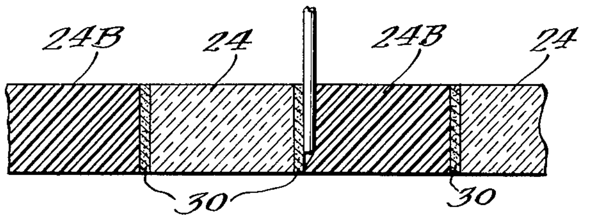
FIGURES 9 and 10 are sectional views.
Figure 10:
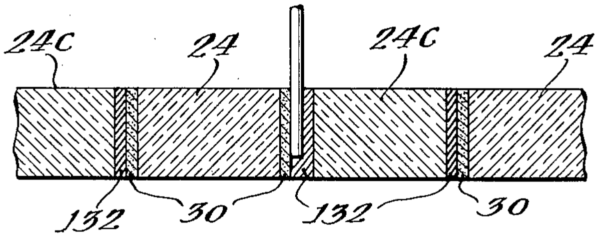

When it is desirable to interconnect wires varying greatly in diameter and to place more than two such wires between a single pair of bars 24, some resilience must be provided to accommodate these wires. The simplest construction under these circumstances is to fabricate the bars 24 of transparent resilient plastic. It may under some circumstances be preferable to employ alternately rigid bars 24 coated with electrically conducting layers 28 or 30 on their parallel surfaces and bars 24B which have no electrically conducting coatings, but which are of resilient plastic material. FIGURE 9 shows such a construction. It is also suitable to employ a bar 24C of rigid material with one parallel surface with an electrically conducting layer, and the other parallel surface provided with a layer 132 of resilient material, such as a layer of polyethylene plastic. This construction is shown in FIGURE 10.

Figure 11:
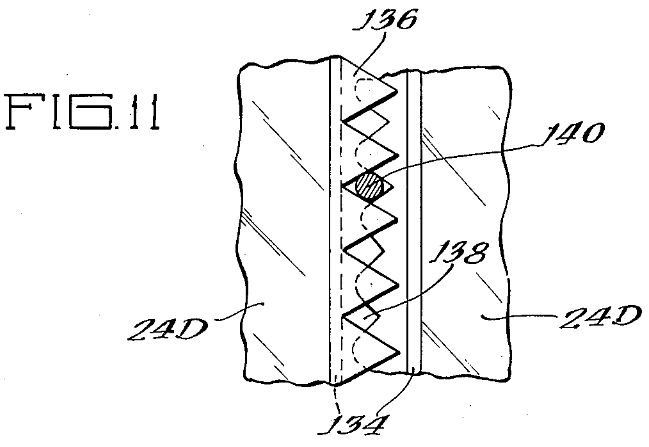
FIGURE 11 is a plan view illustrating modifications of the invention.

FIGURE 11 illustrates electrically conducting metal clamping strips secured to the surfaces of two adjacent basr 24D for gripping a wire between the bars. The bars 24D are constructed of transparent material, and a plate 134 is secured to the parallel surfaces of each of the bars 24D. A plurality of teeth 136 extend outwardly from the plate 134, and the teeth of adjacent bars 24D are slidably disposed relative to each other and are aligned with each other. As a result, openings of adjustable size, designated 138, are disposed between adjacent bars 24D, and when the bars 24D are forced together, an electrically conducting wire or pin, such as designated at 140, becomes clamped between the teeth 136 of adjacent bars. With this construction, the angle of the teeth controls the size of the opening for the wire or pin, and a single plate 134 may be provided with teeth of different angles to accommodate different size wires, as illustrated in FIGURE 11.

The foregoing disclosure will suggest many applications and modifications of the devices here disclosed to those skilled in the art. It is therefore intended that the scope of the present invention be not limited by the foregoing disclosure, but rather only by the appended claims.

The invention claimed is:

1. An instructional device comprising a plurality of elongated bars of electrical insulating material, each bar having two parallel surfaces, means for retaining said bars adjacent to each other in a unitary assembly with the adjacent parallel surfaces of the bars exerting pressure on each other, and an elongated layer of electrically conducting material disposed between adjacent bars.

2. An instructional device comprising a plurality of elongated bars of electrical insulating material, each bar having two parallel surfaces, a layer of electrically conducting material disposed on each of the parallel surfaces of said bars, and means for retaining said bars adjacent each other in a unitary assembly with the parallel surfaces of the bars disposed parallel to each other, said retaining means including a releasable means for urging the assembled bars toward each other, the adjacent parallel surfaces of the bars exerting pressure on each other, whereby electrical components may be mounted on the assembled bars when the urging means is released by inserting the terminals thereof between adjacent bars and thereafter urging the assembled bars toward each other to lock the terminals of the components between the assembled bars and electrically interconnect the terminals.

3. An instructional device comprising the elements of claim 2 wherein the bars are constructed of transparent electrically insulating material in combination with means for mounting a chart approximately normal to the parallel surfaces of the bars and adjacent to one side of the assembled bars, whereby electrical components may be mounted to the assembled bars on the side opposite the chart in the manner directed by the chart.

4. An instructional device comprising the elements of claim 2 wherein the confronting surfaces of two bars are each provided with an equal number of electrically conducting layers disposed along the axis of the bars, the layers of each bar being electrically insulated from each other and confronting a single layer of the adjacent bar.

5. An instructional device comprising a plurality of straight transparent bars of equal length, each bar having a rectangular cross-section, and two parallel surfaces of each bar being substantially identical for all bars, said bars being constructed of electrically insulating material, a plurality of equal length layers of electrically conducting material disposed on one of the identical surfaces of each bar along the axis thereof and electrically insulated from each other, means for restraining said bars adjacent to each other with the identical surfaces of each bar parallel to each other, said restraining means urging the bars toward each other, and means for mounting a chart confronting and generally parallel to the plane of the assembled bars for instructional materials.

6. An instructional device comprising the elements of claim 5 wherein the bars are provided with a rectangular cross-section in combination with a board of electrical insulating material having a plurality of pins of electrically conducting material extending normally from one side of the board, said pins being in a row and spaced from each other by a distance approximately equal to the cross-sectional dimensions of the bars, and a component of an electrical device mounted to the side of the board opposite the pins and electrically connected to the pins, said pins being removably disposed between the confronting surfaces of adjacent bars.

7. An instructional device comprising the elements of claim 5 in combination with a transparent plate disposed between the plane of the bars and the means for mounting a chart.

8. An instructional device comprising the elements of claim 2 wherein each bar has two bores extending therethrough normal to the parallel surfaces, the bores in each bar being spaced longitudinally by a common distance, and the restraining means comprises a first rod extending through one of the bores of each bar, a second rod extending through the other bore of each bar, each of said rods having an outwardly extending flange on one end and being threaded on the other end, and a nut threadedly engaging the other end of each of the rods.

9. An instructional device comprising the elements of claim 2 wherein the restraining means for the bars comprises a frame having a pair of parallel slots, the ends of the bars being loosely disposed within the slots, a flexible strap disposed about the frame and between the bars and the frame, and releasable means for maintaining tension on the flexible strap.

10. An instructional device comprising the elements of claim 5 wherein the means for restraining the bars adjacent to each other includes a support structure, and the means for mounting a chart; one side of the assembled bars comprises a guide plate mounted to the support structure parallel and spaced from the assembled bars, said guide plate having a pair of spaced openings therein, a transparent plate disposed between the guide plate and the assembled bars, and a pair of reels, one of said reels being rotatably mounted to the support structure adjacent to each opening, whereby a flexible strip may be positioned between the two plates and secured at its ends to the reels.

11. An instructional device comprising a first and a second group of elongated bars of electrically insulating material, each bar having two parallel surfaces, a layer of electrically conducting material disposed on each of the parallel surfaces of the bars in the first group and the second group of bars being constructed of compliant material, and means for restraining the bars adjacent to each other in a unitary structure with each bar of the first group disposed between bars of the second group, said restraining means including a releasable means for urging the assembled bars toward each other, whereby electrical components may be mounted between the structure of the bars when the restraining means is released by inserting the terminals thereof between the bars and thereafter urging the bars toward each other to lock the terminals of the components between the bars and electrically interconnect the terminals.

12. An instructional device comprising a first and a second group of elongated bars of electrically insulating material, each bar having two parallel surfaces, a layer of electrically conducting material disposed on each of the parallel surfaces of the bars of the first group, a layer of resilient material disposed on each of the parallel surfaces of the bars of the second group, and means for restraining the bars adjacent to each other in a unitary structure with each bar of the first group disposed between bars of the second group and with the electrically conducting layers thereon abutting the resilient layers of bars of the second group, said restraining means including a releasable means for urging the bars toward each other.

13. An instructional device comprising a plurality of elongated bars of electrically insulating material, each bar having two parallel surfaces, an electrically conducting member having outwardly extending teeth mounted to one of the parallel surfaces of each bar, a second electrically conducting member having outwardly extending teeth mounted to the other surface of each bar, and means for restraining the bars adjacent to each other in a unitary structure with the first electrically conducting member of each bar confronting the second electrically conducting member of the adjacent bar, the outwardly extending teeth of the first and second electrically conducting members being aligned in a direction normal to the axis of the bars and mating with each other to form openings therebetween for electrical conductors, and said restraining means including a releasable means for urging the assembled bars toward each other.

14. An instructional device comprising a plurality of elongated bars of electrically insulating material, each bar having two parallel surfaces, releasable means for mounting the bars in a common plane with the parallel surfaces of the bars compressed between the parallel surfaces of adjacent bars, a layer of electrically conducting material disposed on the surface of a bar compressed between adjacent bars, and a layer of resilient material disposed on the confronting surface of the bar adjacent to the layer of conducting material, said resilient layer being in abutment with said layer of conducting material.

15. An instructional device comprising the elements of claim 14 wherein each bar has two bores extending therethrough normal to the parallel surfaces, the bores in each bar being spaced longitudinally by a common distance, and the mounting means comprises a first rod extending through one of the bores of each bar, a second rod extending through the other bore of each bar, each of said rods having an outwardly extending flange on one end and being threaded on the other end, and a nut threadedly engaging the other end of each of the rods.

16. An instructional device comprising a plurality of elongated bars of electrical insulating material, each bar having two parallel surfaces, means for restraining said bars with the axes of elongation of the bars disposed in a common plane and the parallel surfaces of the bars parallel to each other, said means including a clamp for urging the bars toward each other, and a layer of electrically conducting material disposed between adjacent bars.

References Cited in the file of this patent

UNITED STATES PATENTS

| | | |
|---|---|---|
| 1,705,315 | States | Mar. 12, 1929 |

FOREIGN PATENTS

| | | |
|---|---|---|
| 344,668 | Great Britain | Mar. 12, 1931 |